(12) United States Patent
Glassman (10) Patent No.: US 12,285,917 B2
(45) Date of Patent: Apr. 29, 2025

(54) METHOD AND SYSTEM FOR CONTROLLING A COOLING SYSTEM IN THREE-DIMENSIONAL PRINTING

(71) Applicant: Stratasys Ltd., Rehovot (IL)

(72) Inventor: Barak Glassman, Nes Ziona (IL)

(73) Assignee: Stratasys Ltd., Rehovot (IL)

( * ) Notice: Subject to any disclaimer, the term of this patent is extended or adjusted under 35 U.S.C. 154(b) by 699 days.

(21) Appl. No.: 17/419,808

(22) PCT Filed: Dec. 30, 2019

(86) PCT No.: PCT/IL2019/051435
§ 371 (c)(1),
(2) Date: Jun. 30, 2021

(87) PCT Pub. No.: WO2020/141515
PCT Pub. Date: Jul. 9, 2020

(65) Prior Publication Data
US 2022/0080671 A1    Mar. 17, 2022

Related U.S. Application Data

(60) Provisional application No. 62/786,569, filed on Dec. 31, 2018.

(51) Int. Cl.
*B29C 64/393* (2017.01)
*B22F 10/80* (2021.01)
(Continued)

(52) U.S. Cl.
CPC ............ *B29C 64/393* (2017.08); *B22F 10/85* (2021.01); *B22F 12/20* (2021.01); *B22F 12/53* (2021.01);
(Continued)

(58) Field of Classification Search
CPC ... B29C 64/393; B29C 64/188; B29C 64/209; B29C 64/112; B29C 64/295; B22F 10/85;
(Continued)

(56) References Cited

U.S. PATENT DOCUMENTS 6,259,962 B1    7/2001  Gothait
6,569,373 B2    5/2003  Napadensky
(Continued)

FOREIGN PATENT DOCUMENTS

EP          2667987       12/2013
WO    WO 2020/141515       7/2020

OTHER PUBLICATIONS

International Preliminary Report on Patentability Dated Jul. 15, 2021 From the International Bureau of WIPO Re. Application No. PCT/IL2019/051435. (9 Pages).
(Continued)

*Primary Examiner* — Thomas C Lee
*Assistant Examiner* — Tyler Dean Hedrick (57) ABSTRACT

A method of additive manufacturing, comprises: dispensing from an array of nozzles an amount of building material formulation to form a layer in a configured pattern corresponding to a shape of a slice of an object, and hardening the layer. Based on the amount and a geometrical characteristic of the slice, a thermal mass of the layer is calculated. A cooling system is controlled in a closed loop control responsively to the calculated thermal mass.

16 Claims, 6 Drawing Sheets

(51) Int. Cl.

| | |
|---|---|
| *B22F 10/85* | (2021.01) |
| *B22F 12/20* | (2021.01) |
| *B22F 12/53* | (2021.01) |
| *B22F 12/55* | (2021.01) |
| *B29C 64/188* | (2017.01) |
| *B29C 64/209* | (2017.01) |
| *B33Y 10/00* | (2015.01) |
| *B33Y 30/00* | (2015.01) |
| *B33Y 40/20* | (2020.01) |
| *B33Y 50/02* | (2015.01) |
| *B22F 10/14* | (2021.01) |
| *B22F 10/18* | (2021.01) |
| *B22F 10/22* | (2021.01) |
| *B22F 10/40* | (2021.01) |
| *B29C 64/112* | (2017.01) |

(52) U.S. Cl.
    CPC ............ *B22F 12/55* (2021.01); *B29C 64/188* (2017.08); *B29C 64/209* (2017.08); *B33Y 10/00* (2014.12); *B33Y 30/00* (2014.12); *B33Y 40/20* (2020.01); *B33Y 50/02* (2014.12); *B22F 10/14* (2021.01); *B22F 10/18* (2021.01); *B22F 10/22* (2021.01); *B22F 10/40* (2021.01); *B22F 10/80* (2021.01); *B29C 64/112* (2017.08)

(58) Field of Classification Search
    CPC .......... B22F 12/20; B22F 12/53; B22F 12/55; B22F 10/14; B22F 10/18; B22F 10/22; B22F 10/40; B22F 10/80; B22F 2999/00; B22F 3/1028; B22F 2203/03; B22F 2203/11; B33Y 10/00; B33Y 30/00; B33Y 40/20; B33Y 50/02; Y02P 10/25
    See application file for complete search history.

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,962,237 B2 | 6/2011 | Kritchman |
| 9,031,680 B2 | 5/2015 | Napadensky |
| 2010/0191360 A1 | 7/2010 | Napadensky et al. |
| 2016/0144564 A1* | 5/2016 | Padgett ................ B29C 64/209 425/113 |
| 2017/0151722 A1 | 6/2017 | Prasad et al. |
| 2018/0001567 A1* | 1/2018 | Juan ........................ B22F 10/10 |
| 2018/0043612 A1* | 2/2018 | Gray ...................... B33Y 30/00 |
| 2018/0154443 A1 | 6/2018 | Milshtein et al. |
| 2018/0229448 A1* | 8/2018 | Bastian ................... B29C 64/40 |
| 2018/0236716 A1* | 8/2018 | Shirakawa .............. B29C 67/00 |
| 2019/0030797 A1* | 1/2019 | Ge ......................... B29C 64/336 |
| 2019/0077081 A1* | 3/2019 | Susnjara ................ B33Y 30/00 |
| 2021/0291456 A1* | 9/2021 | Kothari ................. B29C 64/393 |
| 2022/0016842 A1* | 1/2022 | Leyva Mendivil ..... B22F 10/28 |

OTHER PUBLICATIONS

International Search Report and the Written Opinion Dated Mar. 30, 2020 From the International Searching Authority Re. Application No. PCT/IL2019/051435. (11 Pages).

Office Action Dated Jun. 13, 2024 From the Israel Patent Office Re. Application No. 284520. (3 Pages).

* cited by examiner

METHOD AND SYSTEM FOR CONTROLLING A COOLING SYSTEM IN THREE-DIMENSIONAL PRINTING

RELATED APPLICATIONS

This application is a National Phase of PCT Patent Application No. PCT/IL2019/051435 having International filing date of Dec. 30, 2019, which claims the benefit of priority under 35 USC § 119(e) of U.S. Provisional Patent Application No. 62/786,569 filed on Dec. 31, 2018. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to a method and system for controlling a cooling system in three-dimensional printing.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

SUMMARY OF THE INVENTION

According to an aspect of some embodiments of the present invention there is provided a method of additive manufacturing of a three-dimensional object. The method comprises: dispensing from an array of nozzles an amount of building material formulation to form a layer in a configured pattern corresponding to a shape of a slice of the object; hardening the layer; based on the amount and a geometrical characteristic of the slice, calculating a thermal mass of the layer; and in a closed loop control, activating, deactivating, or setting a power of a cooling system for cooling the layer, responsively to the calculated thermal mass.

According to some embodiments of the invention the method comprises repeating the dispensing and the hardening at least once to form a plurality of layers, wherein the calculation is executed for each layer separately.

According to some embodiments of the invention the method comprises repeating the dispensing and the hardening at least once to form a plurality of layers, wherein the calculation is executed after at least two layers are formed.

According to some embodiments of the invention the method comprises storing the calculated thermal mass in a memory.

According to some embodiments of the invention, the method comprises extracting from the memory a previously calculated thermal mass, wherein the calculation is also based on the previously calculated thermal mass.

According to some embodiments of the invention, the method comprises calculating formation time of the layer, wherein the calculation is also based on the formation time.

According to some embodiments of the invention, the method comprises determining a perimeter of the layer, wherein the calculation is also based on the perimeter.

According to some embodiments of the invention, the method comprises determining an area of peripheral walls formed by the layer and by the previously formed layers, wherein the calculation is also based on the area of the walls.

According to an aspect of some embodiments of the present invention there is provided a system for additive manufacturing of a three-dimensional object. The system comprises: an array of nozzles for dispensing a building material formulation; a hardening system for hardening the building material formulation; a cooling system; and a computerized controller configured for controlling the array of nozzles, the hardening system, and the cooling system, to execute the method as delineated hereinabove and optionally and preferably as further detailed below.

According to an aspect of some embodiments of the present invention there is provided a system for additive manufacturing of a three-dimensional object. The system comprises: an array of nozzles for dispensing a building material formulation; a hardening system for hardening the building material formulation; a cooling system; and a computerized controller. In some embodiments of the present invention the computerized controller is configured for controlling the array of nozzles to dispense an amount of building material formulation to form a layer in a configured pattern corresponding to a shape of a slice of the object, for controlling the hardening system to harden the layer, for calculating, based on the amount and a geometrical characteristic of the slice, a thermal mass of the layer; and for controlling, activating, deactivating, or setting a power of the cooling system in a closed loop control responsively to the calculated thermal mass.

According to some embodiments of the invention the controller is configured for repeating the dispensing and the hardening at least once to form a plurality of layers, and to execute the calculation for each layer separately.

According to some embodiments of the invention the controller is configured for repeating the dispensing and the hardening at least once to form a plurality of layers, and to execute the calculation after at least two layers are formed.

According to some embodiments of the invention the controller is configured for storing the calculated thermal mass in a memory.

According to some embodiments of the invention the controller is configured for extracting from the memory a previously calculated thermal mass, wherein the calculation is also based on the previously calculated thermal mass.

According to some embodiments of the invention the controller is configured for calculating the thermal mass also based on a formation time of the layer.

According to some embodiments of the invention the controller is configured for determining a perimeter of the layer, wherein the calculation is also based on the perimeter.

According to some embodiments of the invention the controller is configured for determining an area of peripheral walls formed by the layer and by the previously formed layers, wherein the calculation is also based on the area of the walls.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to three-dimensional printing and, more particularly, but not exclusively, to a method and system for controlling a cooling system in three-dimensional printing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a printing head having one or more arrays of nozzles to deposit building material formulation in layers on a supporting structure. The AM apparatus thus dispenses building material formulation in target locations which are to be occupied and leaves other target locations void. The apparatus typically includes a plurality of arrays of nozzles, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are both located in separate the same printing head.

Figure 1A:
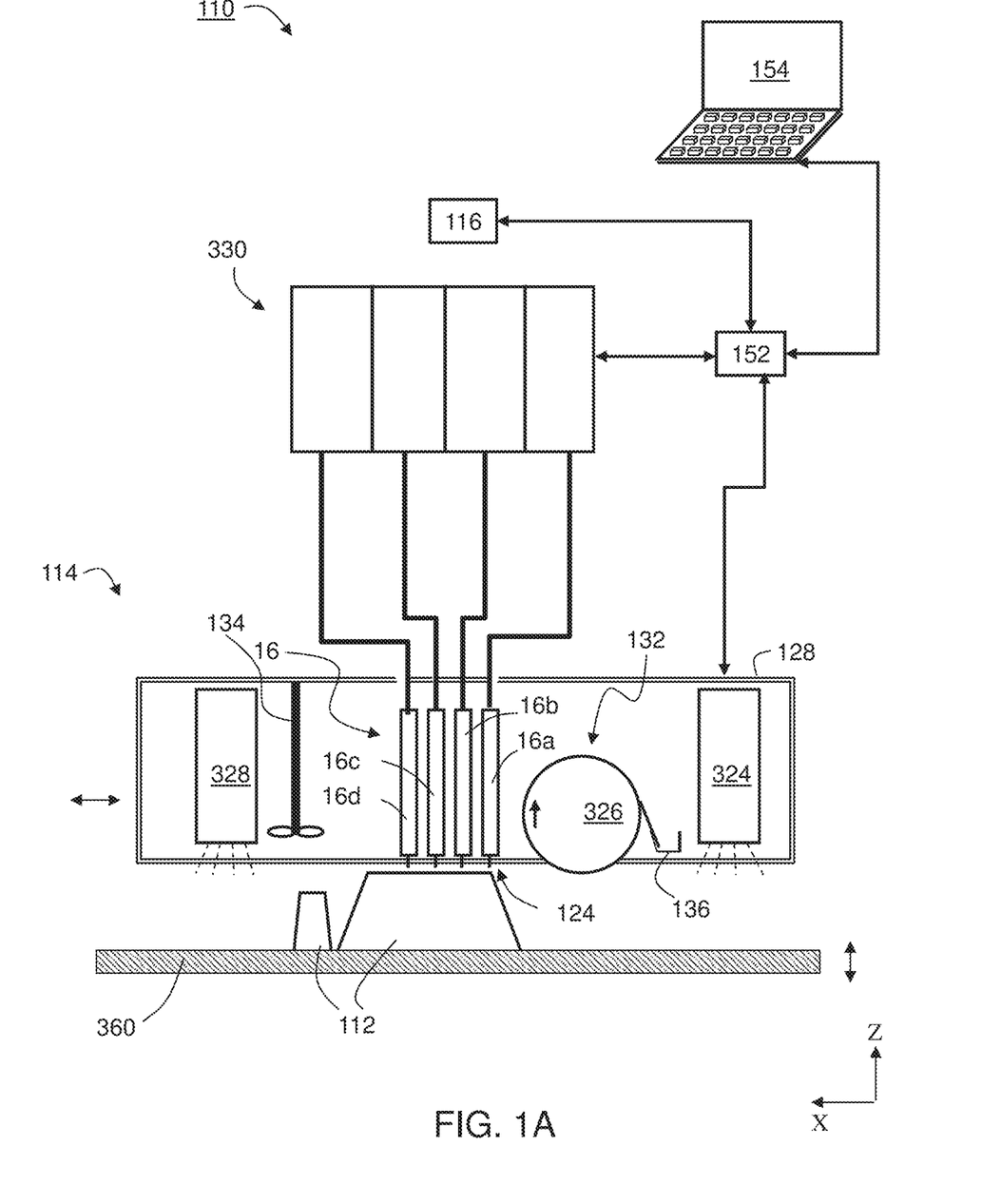
FIGS. 1A-D are schematic illustrations of an additive manufacturing system according to some embodiments of the invention.
Figure 2A:
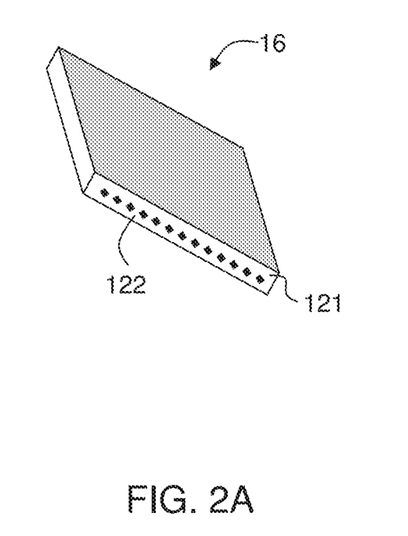
FIGS. 2A-2C are schematic illustrations of printing heads according to some embodiments of the present invention.
Figure 2B:
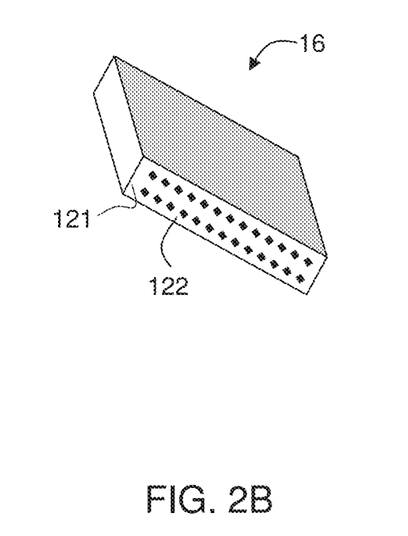
Figure 2C:
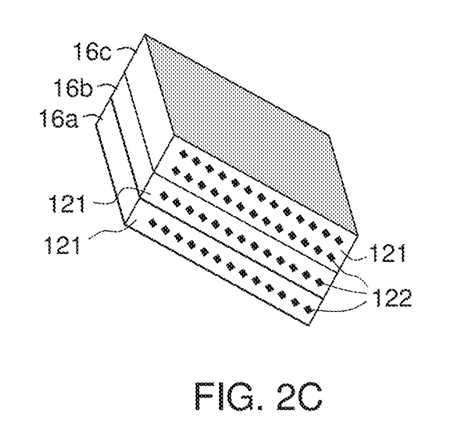

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material formulation 124 is dispensed.

Preferably, but not obligatorily, apparatus 114 is a three-dimensional printing apparatus, in which case the printing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each printing head is optionally and preferably fed via one or more building material formulation reservoirs which may optionally include a temperature control unit (e.g., a temperature sensor and/or a heating device), and a material formulation level sensor. To dispense the building material formulation, a voltage signal is applied to the printing heads to selectively deposit droplets of material formulation via the printing head nozzles, for example, as in piezoelectric inkjet printing technology. The dispensing rate of each head depends on the number of nozzles, the type of nozzles and the applied voltage signal rate (frequency). Such printing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four printing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense one modeling material formulation, head 16b can dispense another modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein throughout the term "about" refers to ±10%.

For example, for a=1, the overall dispensing rate of support material formulation is generally the same as the overall dispensing rate of the modeling material formulation when all the arrays of nozzles operate.

Apparatus 114 can comprise, for example, M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises a cooling system 134 such as one or more fans or the like The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the material formulations just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the printing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the printing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the printing heads, the layer thus formed may be straightened by leveling device 326, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle, and the number of scans in a single scan cycle is referred to herein as the swath factor.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A control unit 152 controls fabrication apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each printing head or each nozzle array and the temperature of the building material formulation in the respective printing head or respective nozzle array.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
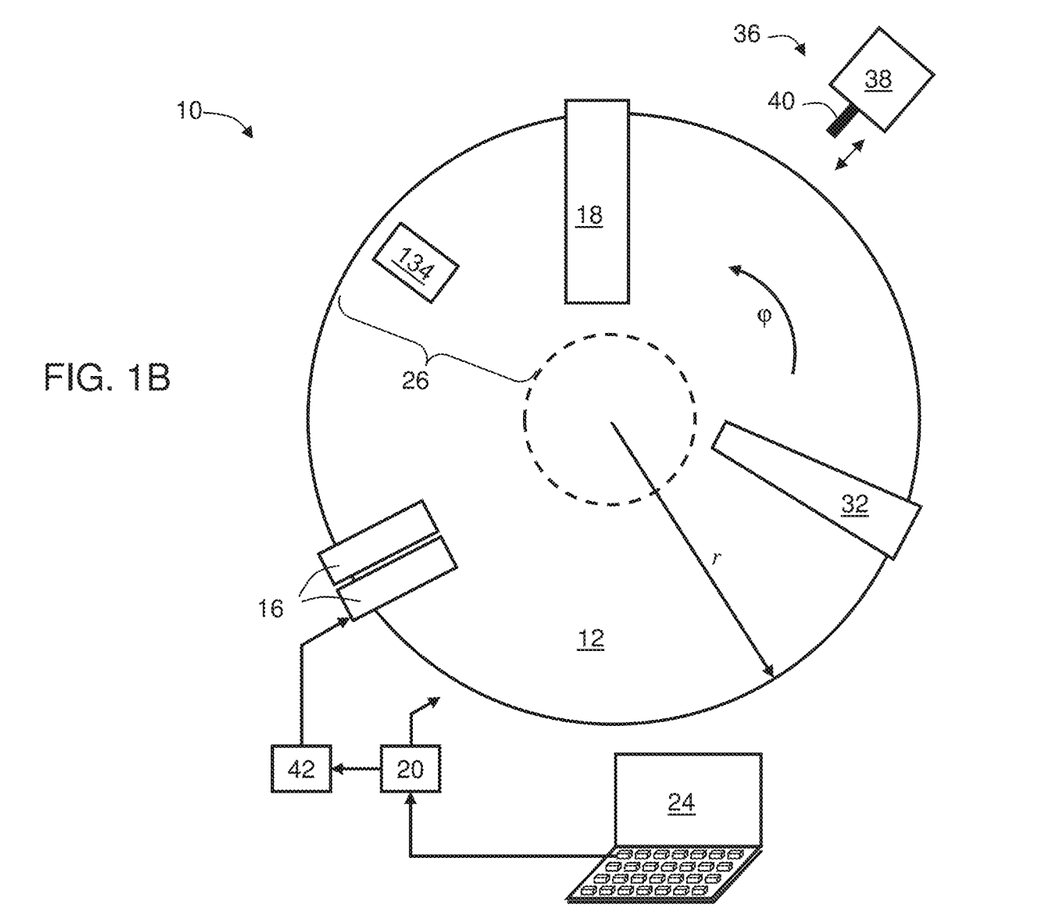
Figure 1C:
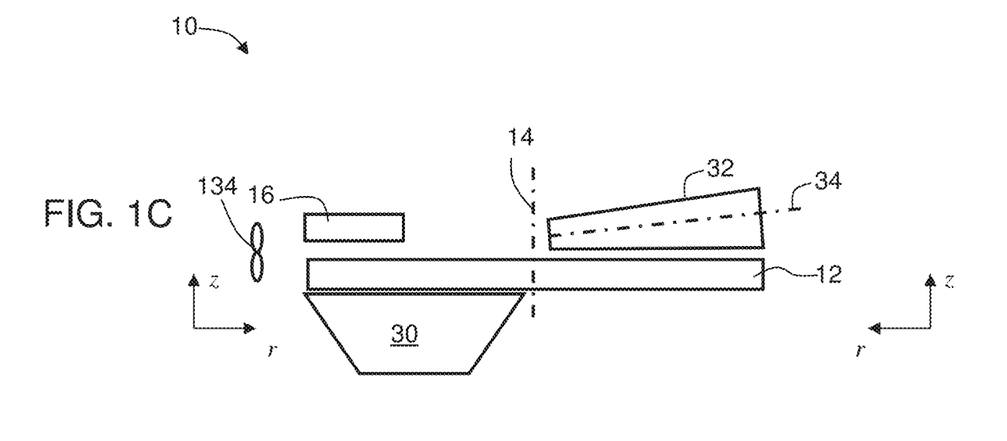
Figure 1D:
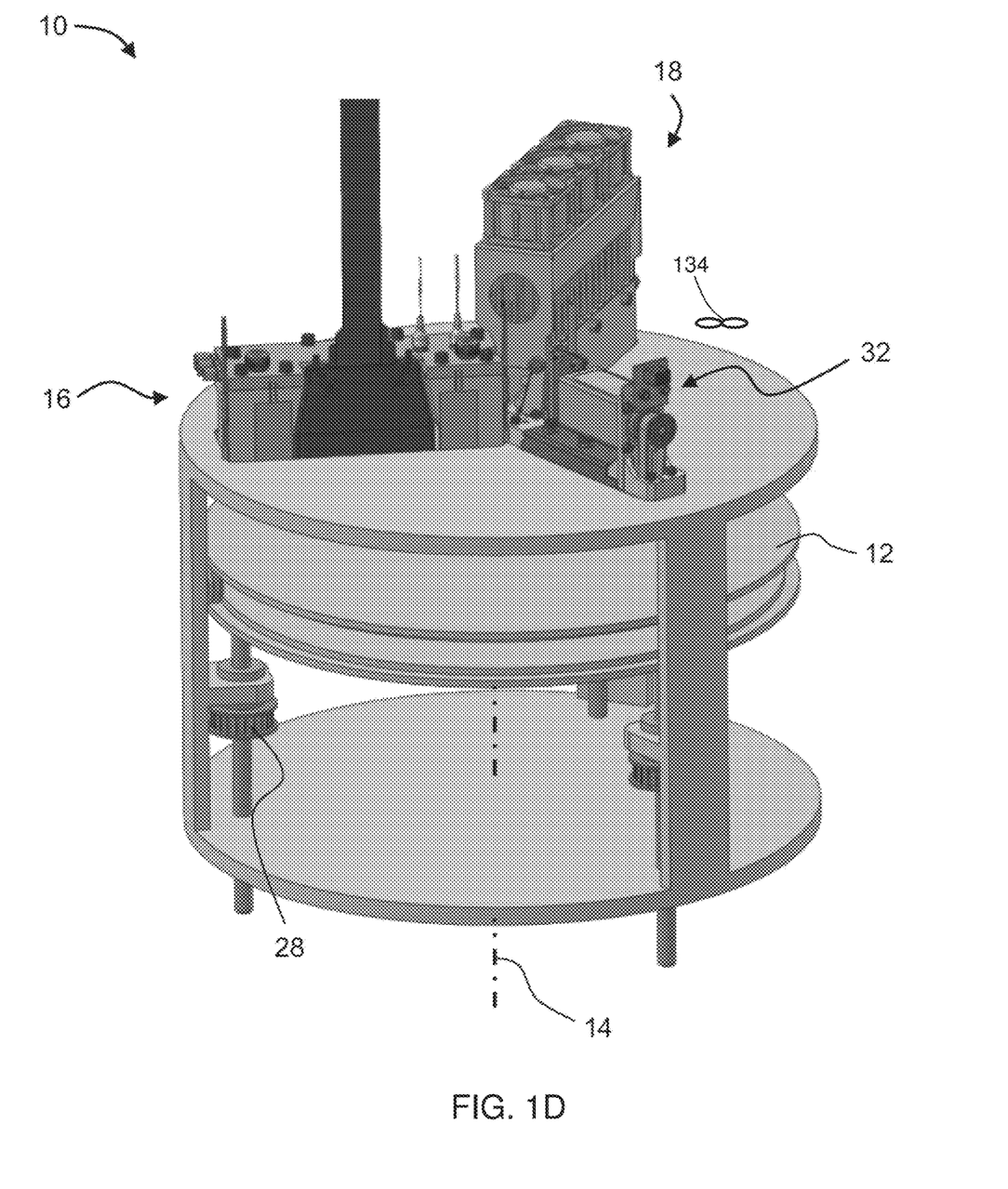

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Similarly to system 110, system 10 also preferably comprises a cooling system 134 such as one or more fans or the like.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
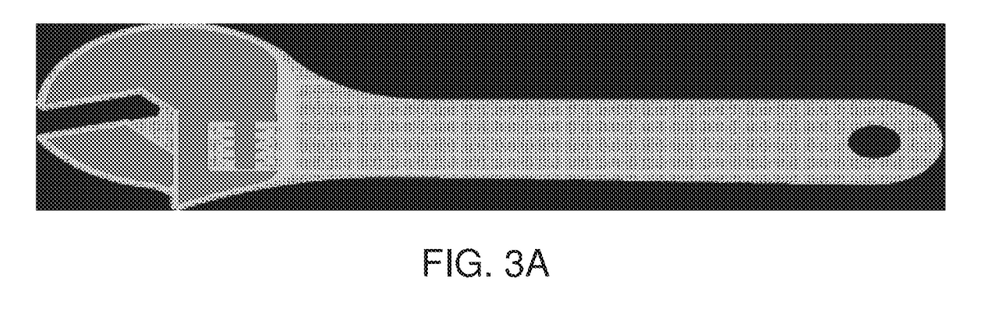
FIGS. 3A and 3B are schematic illustrations demonstrating coordinate transformations according to some embodiments of the present invention.
Figure 3B:
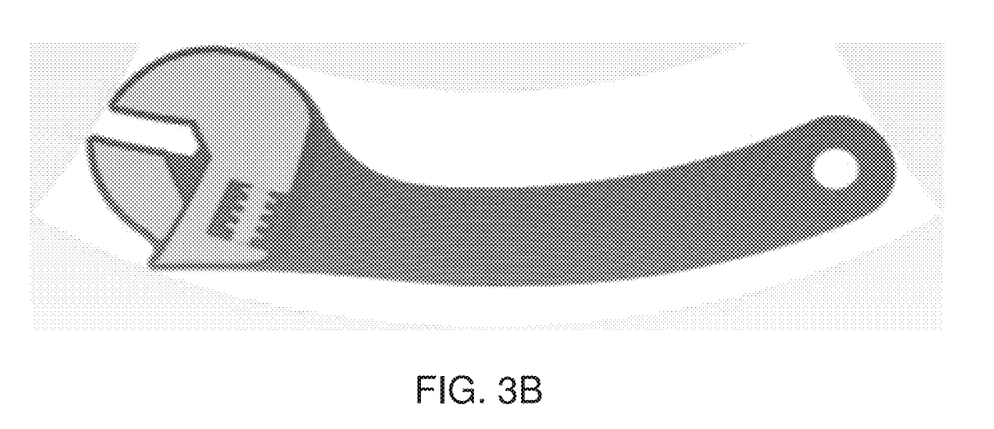

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20. As in system 110 above, the scan cycle and swath factor are also defined for system 10. In this case, the scan cycle is defined as the series of relative rotations between head(s) 16 and tray 12 that are needed to complete a single layer, and the swath factor is defined as the number of relative rotations in a single scan cycle.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

It was realized by the present inventor that energy and optionally and preferably also printing time can be saved by a judicial activation of the cooling system 134. The present inventor found that it is advantageous to activate, deactivate or otherwise set the power of cooling system 134, during the AM of an object responsively to the thermal mass of the uppermost layer.

Figure 4:
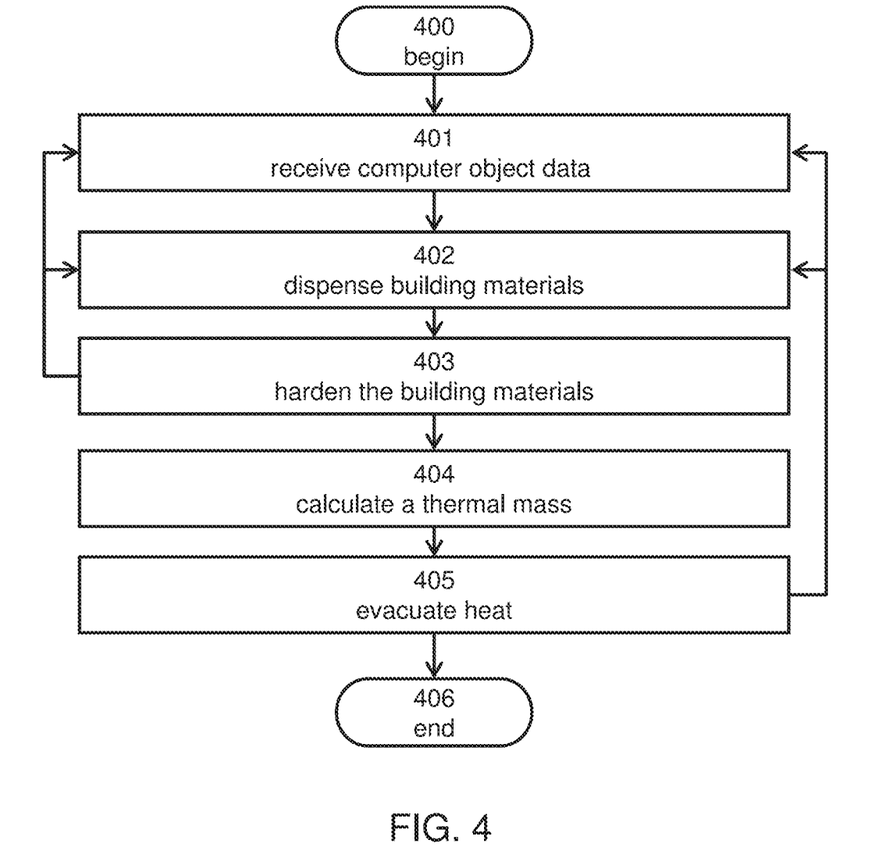
FIG. 4 is a flowchart diagram of a method suitable for additive manufacturing according to some embodiments of the present invention.

FIG. 4 is a flowchart diagram of a method suitable for additive manufacturing according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by an AM system (e.g., system 110 or system 10) operated by a controller (e.g., controller 152 or 20). The method begins at 400 and optionally and preferably proceeds to 401 at which at which computer object data that collectively pertain to a three-dimensional shape of the object are received. The data can be received by a data processor (e.g., processor 154 or 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. The computer object data typically include a plurality of slice data each defining a layer of the object to be manufactured. The data processor can transfer the data, or a portion thereof, to the controller of the AM system. Typically, but not necessarily, the controller receives the data on a slice-by-slice basis. The data can be in any data format known in the art, including, any of the aforementioned computer object data formats.

The method continues to 402 at which building materials are dispensed, for example, using one or more of dispensing heads 16, on a receiving surface. The receiving surface can be the working surface of the AM system (e.g., tray 12 or 360) or it can be a previously formed layer of one or more building materials. The method continues to 403 at which the dispensed building materials are hardened to form hardened materials. Operation 403 can be executed by hardening device 324, and may include applying curing radiation to the dispensed material(s). The type of radiation (e.g., electromagnetic, electron beam, etc.) is selected based on the building materials being used. For example, for UV polymerizable materials an ultraviolet electromagnetic radiation is preferred.

The method continues to 404 at which a thermal mass is calculated. The calculation can include the thermal mass of only the newly formed layer, or it can include calculation of an aggregated thermal mass including the thermal mass of the newly formed layer and the thermal mass of one or more, e.g., some or all of the layers beneath the newly formed layer. Operation 404 can be executed after each layer has been formed, or alternatively after several layers have been formed. For example, operations 404 can be skipped during the formation of k successive layers, then executed once, then skipped during the formation of additional k layers, and so on.

The thermal mass can be expressed in units of energy per unit temperature, in which case it describes the energy that is required to change the temperature of the layer by a unit degree of temperature. For example, when the thermal mass is expressed in units of Joule per degree Celsius, it describes the amount of energy in Joules that is required to change the temperature of the layer by one degree Celsius.

The thermal mass can be calculated, for example, based on the amount of material that is dispensed to form the layer and based on one or more geometrical characteristics of the slice, which geometrical characteristics typically include at least the overall surface of the slice.

In some embodiments of the present invention the thermal mass is calculated based on one or more previously calculated thermal masses. Typically, the thermal mass of the layer is added to the sum of previously calculated thermal masses. In these embodiments the previously calculated thermal masses are stored in a memory. The stored thermal masses can be extracted from the memory to calculate the thermal mass of the next layer or layers. For example, the thermal mass $C_m$ of the mth layer can be calculated according to the equation:

$$C_m = C_{m-1} + \Sigma F_n D_n$$

where the summation $\Sigma$ is from 1 to n, where n is the number of building material formulations that are dispensed to form the layer, where $F_n$ is a thermal mass of a single droplet of the nth building material, and $D_n$ is the number of droplets of the nth building material that have been dispensed to form the layer.

In some embodiments of the present invention, the thermal mass is calculated, at least partially based on the perimeter of the layer, or, more preferably, based on an area of the peripheral walls formed by the layer and by the previously formed layers.

Since the hardening of the building material is typically an exothermic process, longer formation time can result in higher thermal masses. Therefore, in some embodiments of the present invention, the calculation of the thermal mass is also based on the formation time of the layer. Other factors that may be considered for calculating the thermal mass include, without limitation, the number of objects that are manufactured simultaneously, and the swath factor.

The thermal mass can be calculated analytically or using a previously prepared lookup table, or using a numerical procedure, such as, but not limited to, a trained machine learning procedure.

The method continues to 405 at which heat is evacuated away from the building materials. This can be executed by operating cooling system 134. In some embodiments of the present invention cooling system 134 is mounted above the working surface (e.g., tray 12 or 360) of the AM system in a manner that allows relative motion between cooling system 134 and the working surface along the scanning direction x or the azimuthal direction φ. This allows cooling system 134 to evacuate the heat in a generally localized manner, wherein heat is evacuated more efficiently from regions below cooling system 134 than from regions farther from cooling system 134. During the relative motion, different regions are effectively cooled by system 134. Alternatively, cooling system 134 can be mounted at a static location relative to the dispensed materials, in which case cooling system 134 effects heat evacuation globally from the entire surface of the newly formed layer.

The heat is preferably evacuated at a rate that is selected based on the calculated thermal mass. The rate can be selected by controlling, preferably in a closed loop control, cooling system 134. The control can include activating, deactivating, or setting a power supplied to cooling system 134. For example, when cooling system 134 comprises one or more fans, the power is controlled to vary the rotation speed of the fan(s), hence also the heat evacuation rate. Control over the power supplied to cooling system 134 can be effected by varying any operational parameter used by system 134, including, without limitation, voltage, pulse width, pulse repetition rate, pulse width modulation, and the like. Generally, more power is allocated to cooling system 134 for higher calculated thermal masses.

In various exemplary embodiments of the invention the rate is selected based only on the calculated thermal mass, without relying on any input from a thermal sensing system.

In some embodiments of the present invention the evacuation rate is varied as a nonlinear function of the calculated thermal mass. For example, the nonlinear function can be a quadratic function of the calculated thermal mass.

When the thermal mass is calculated after several layers have been formed, the closed loop control over cooling system 134 is optionally and preferably executed based on previously calculated thermal masses. During the formation of the layers between any two successive executions of operation 404, cooling system 134 can be operated to evacuate heat at the previously selected rate (e.g., by supplying the same voltage as selected in the previous executions of operation 404). Alternatively, when there are k layers (k>1) that are formed between successive executions of operation 404, the operation of cooling system 134 can be terminated at least temporarily during the formation of these k layers.

From 405 the method optionally and preferably loops back to 401 or 402 to form an additional layer of the object. The loop can continue until all the layers of the object are formed. In embodiments in which operation 404 is not executed on a per-layer basis (e.g., when two or more layers are formed between successive execution of operation 404), the method can loop back from 403 to 401 or 402 before the next execution of 404. Alternatively, the method can skip 404 and continues to 405, at which the cooling system is operated to evacuate the heat at a rate that has been the selected after the previous execution of 404.

The method ends at 406.

The technique optionally and preferably enjoys several advantages over known techniques. Known in the art, are techniques for measuring the temperature of the uppermost layer. These include use of infrared sensors. The present inventor found that such measurement techniques suffer from a number of limitations. Firstly, it requires adding infrared sensors to the three-dimensional printing system, thereby increasing the cost of the system. Secondly, it is complicated to position the infrared sensor due to the existence of the printing block above the layer.

The present inventor has therefore devised a technique in which the thermal mass of one or more layers is calculated during the fabrication of the object, and the cooling system 134 is activated, deactivated, or its power is set responsively to the calculated thermal mass. This is advantageous since it does not require introducing infrared sensors to the three-dimensional printing system, and therefore solves the problem of closed loop control over the heat evacuation rate, without significantly increasing the cost of the system.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of additive manufacturing of a three-dimensional object, the method comprising:
   dispensing from an array of nozzles an amount of building material formulation to form a layer in a configured pattern corresponding to a shape of a slice of the object;
   hardening said layer;
   based on said amount and a geometrical characteristic of said slice, calculating a thermal mass of said layer; and
   in a closed loop control, activating, deactivating, or setting a power of a cooling system for cooling said layer, responsively to said calculated thermal mass.

2. The method of claim 1, comprising repeating said dispensing and said hardening at least once to form a plurality of layers, wherein said calculation is executed for each layer separately.

3. The method of claim 1, comprising repeating said dispensing and said hardening at least once to form a plurality of layers, wherein said calculation is executed after at least two layers are formed.

4. The method according to claim 1, further comprising storing said calculated thermal mass in a memory.

5. The method according to claim 4, further comprising extracting from said memory a previously calculated thermal mass, wherein said calculation is also based on said previously calculated thermal mass.

6. The method according to claim 1, further comprising calculating formation time of said layer, wherein said calculation of said thermal mass is also based on said formation time.

7. The method according to claim 1, further comprising determining a perimeter of said layer, wherein said calculation is also based on said perimeter.

8. The method according to claim 7, further comprising determining an area of peripheral walls formed by said layer and by said previously formed layers, wherein said calculation is also based on said area of said walls.

9. A system for additive manufacturing of a three-dimensional object, the system comprising:
   an array of nozzles for dispensing a building material formulation;
   a hardening system for hardening said building material formulation;
   a cooling system; and
   a computerized controller configured for controlling said array of nozzles to dispense an amount of building material formulation to form a layer in a configured pattern corresponding to a shape of a slice of the object, for controlling said hardening system to harden said layer, for calculating, based on said amount and a geometrical characteristic of said slice, a thermal mass of said layer; and for controlling, activating, deactivating, or setting a power of said cooling system in a closed loop control responsively to said calculated thermal mass.

10. The system of claim 9, wherein said controller is configured for repeating said dispensing and said hardening at least once to form a plurality of layers, and to execute said calculation for each layer separately.

11. The system of claim 9, wherein said controller is configured for repeating said dispensing and said hardening at least once to form a plurality of layers, and to execute said calculation after at least two layers are formed.

12. The system according to claim 9, wherein said controller is configured for storing said calculated thermal mass in a memory.

13. The system according to claim 12, wherein said controller is configured for extracting from said memory a previously calculated thermal mass, wherein said calculation is also based on said previously calculated thermal mass.

14. The system according to claim 9, wherein said controller is configured for calculating said thermal mass also based on a formation time of said layer.

15. The system according to claim 9, wherein said controller is configured for determining a perimeter of said layer, wherein said calculation is also based on said perimeter.

16. The system according to claim 15, wherein said controller is configured for determining an area of peripheral walls formed by said layer and by said previously formed layers, wherein said calculation is also based on said area of said walls.

* * * * *